United States Patent [19]
Coleman

[11] 3,774,049
[45] Nov. 20, 1973

[54] ANTITHEFT DEVICE AND IGNITION CONTROL FOR AUTOMOBILES AND OTHER APPLICATIONS

[76] Inventor: Michael C. Coleman, Laird Rd., Colts Neck, N.J.

[22] Filed: Jan. 17, 1972

[21] Appl. No.: 218,415

[52] U.S. Cl. ................. 307/10 AT, 70/284, 200/44
[51] Int. Cl. ..................... H01h 27/06, H01h 27/10
[58] Field of Search.......................... 200/44, 43, 45; 307/10 AT, 10 R; 70/313, 314, 315, 284; 180/114; 340/63, 64

[56] References Cited
UNITED STATES PATENTS

| | | | |
|---|---|---|---|
| 3,514,556 | 5/1970 | Lafrance | 200/43 |
| 3,582,583 | 6/1971 | Paterson | 200/43 |
| 2,477,104 | 7/1949 | Waite | 200/45 |
| 2,162,995 | 6/1939 | Bruington | 200/45 X |
| 2,192,663 | 3/1940 | Kaiser | 200/45 X |
| 1,787,758 | 1/1931 | Palmer | 200/45 X |
| 3,543,040 | 11/1970 | Nemeth | 307/10 AT |

Primary Examiner—Robert K. Schaefer
Assistant Examiner—William J. Smith
Attorney—Richard S. Shreve, Jr.

[57] ABSTRACT

The electrical circuits of a vehicle are controlled by a circuit breaker, a combination register and an ignition switch in such manner as to prevent unauthorized individuals from operating a vehicle. The breaker has a control arm which can be placed manually in any one of three positions.

1 Claim, 12 Drawing Figures

ANTITHEFT DEVICE AND IGNITION CONTROL FOR AUTOMOBILES AND OTHER APPLICATIONS

SUMMARY OF THE INVENTION

My invention employs special control devices to prevent theft of vehicles. To this end, one or more electrical circuits which enable or prevent operation of the vehicle are controlled by a three position circuit breaker adapted to be placed manually in any one of the following positions: zero, set and hold as well as a register. The register has positions for a plurality of digits as well as a like number of controls each of which can enter any digit from zero through nine in the appropriate position.

When the breaker is in zero position, the register reads zero and the desired circuits are disabled. The user then enters a pre-assigned number into the register. If the number is incorrect, the circuits remain disabled regardless of further steps.

If the proper number is entered, the user can place the breaker either in set or in hold. In either position, the previously disabled circuits are enabled.

However, in the set position, turning the ignition key to the left (accessory) position will return the breaker and register to zero position, disabling the circuits.

In the hold position, the key can be turned in the same manner and with the same result as if my invention was not present.

These principles can be used to control any electrical apparatus in the same manner as described for automobiles above.

This device is designed to prevent automobile theft resulting from a key left in the ignition switch or from the use of a master key and to prevent the theft of automobile parts or accessories lying within the engine area under the hood of the automobile.

Figure 1:
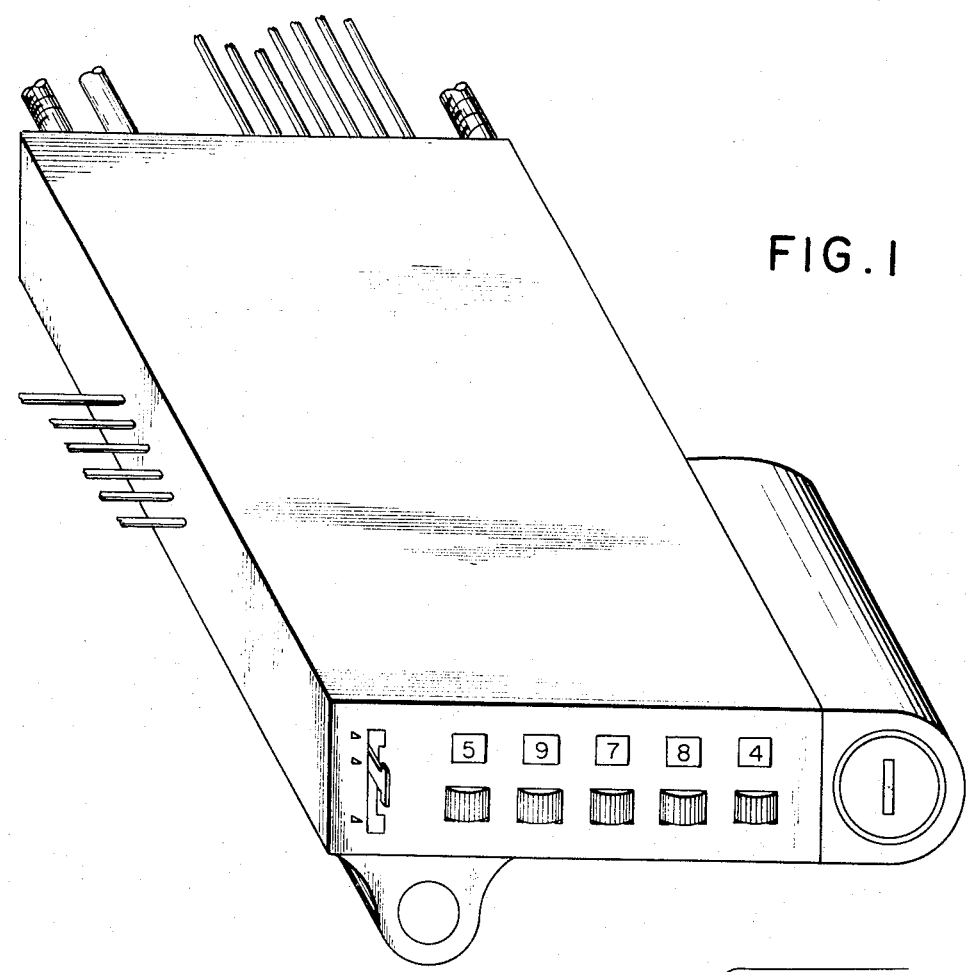
FIG. 1 is a perspective of my invention.
Figure 2:
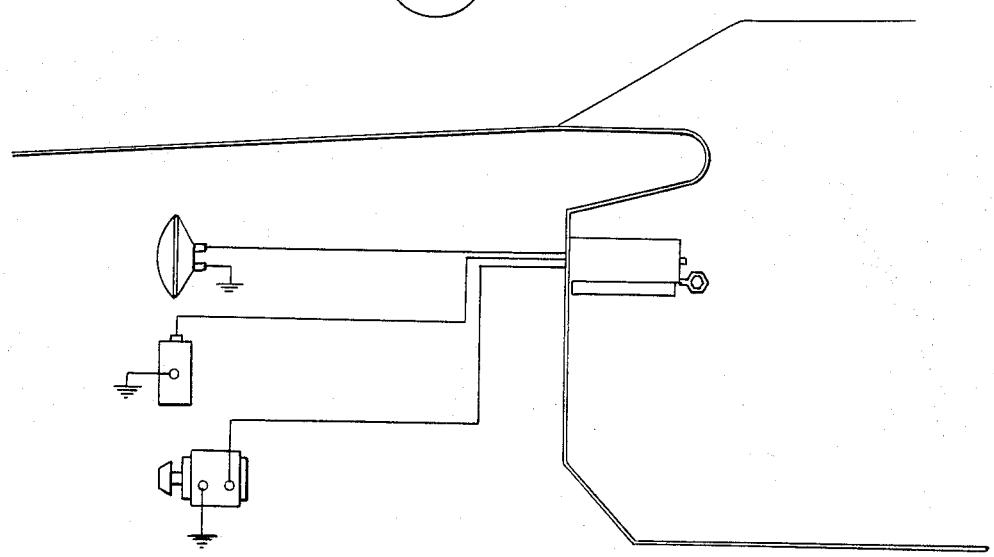
FIG. 2 is a circuit diagram thereof.

The device as shown in FIG. 1 consists of a heavy metal case that bolts to the firewall of the automobile with the nuts of the bolts residing within the engine area. Entering the device from the engine side of the firewall are electrical wires from the coil, lights, or what ever electrically operated parts the installer may choose and these same wires leave the device.

Figure 3:
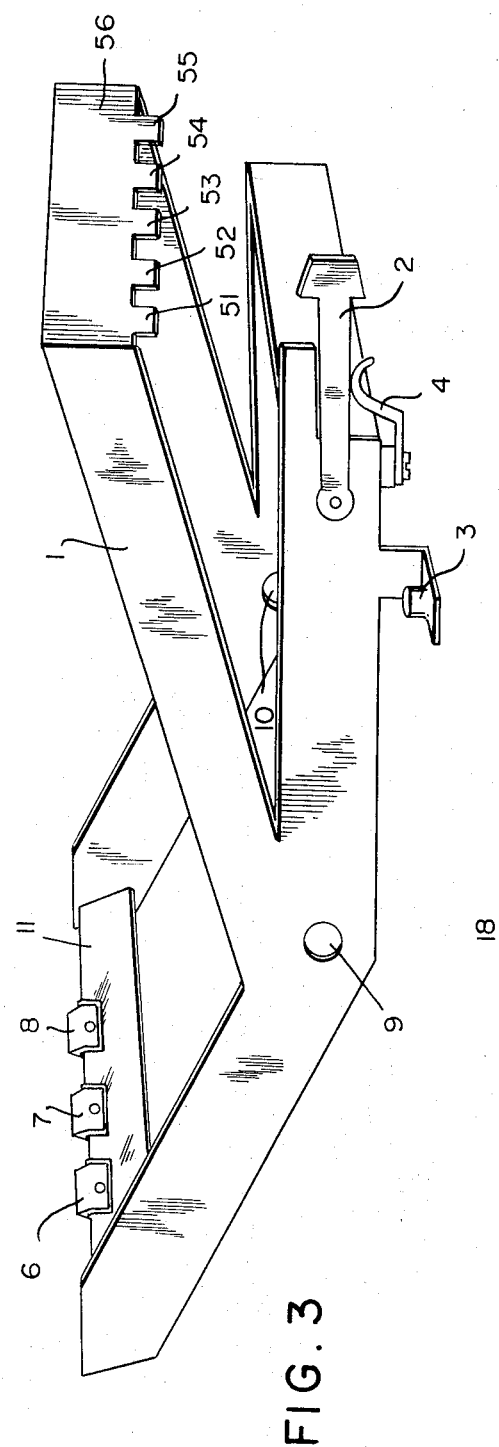
FIG. 3 is a perspective of the control lever.

Within this control unit there is a circuit breaker (control lever 1, FIG. 3) operated by the control lever extension 2, FIG. 3, which opens and closes the circuits of the electrical wires entering and leaving the metal case as well as grounding what electrical wires one may wish to have grounded as chosen when the device was manufactured. The control lever also controls a hood latch release mechanism, FIG. 9.

The control lever and the ignition switch 27, FIG. 5 of the control unit work in the following manner. When the control lever extension is in the zero position, the register consisting of 5 numbers or characters reads zero and the circuits of the desired electrical wiring are either open or grounded as predetermined by the manufacturer and the hood latch release mechanism is locked in place. The operator of the vehicle may now dial in the correct number on the register as a preliminary step to starting the automobile.

After the correct combination has been selected on the register by using the five selection dials (one shown as 14, FIG. 4), the control lever extension may be placed in either of two positions, the set position or the hold position as shown in FIG. 1. With the control lever extension in either of these two positions, all electrical circuits within the device are closed; the previously grounded electrical wires are open; the hood release mechanism is operative, and the ignition switch as a part of the closed electrical circuits may be used.

In the set position, the car may be operated in the usual manner until the ignition key is turned to the left to what is now the accessory position on cars. Turning the key to the left or accessory position will automatically cause the register and control lever extension to flip to the zero position or setting; operation of which has already been described. The key may then be left in the ignition switch with no danger of theft. When the control lever extension is in the hold position, the ignition switch and key may be used and the car operated as if this device were not present in the car at all. Only when the control lever extension is removed from the hold position manually by the operator and the key is turned to the left to clear the register will the antitheft features become functional.

The device may be concealed in the dash for the sake of appearance or for keeping the combination on the register from being displayed to passengers by the use of a cover. The device is shown mounted in the dashboard.

FIG. 3 shows the control lever 1 which pivots on a shaft (not shown) which extends through the pivot holes 9 and 10. The control lever contains the hood latch control stud 3, the electrical contacts 6, 7, and 8 on the rear member 11 of the control lever, the locking teeth 51, 52, 53, 54, 55, on the front extension 56 of the control lever, the control lever extension 2, and the control lever extension spring 4.

Figure 10:
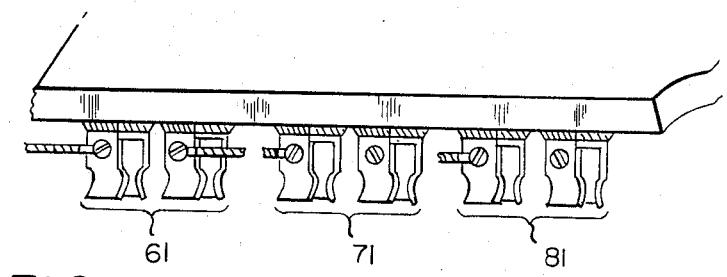
FIG. 10 is a perspective of certain electrical contacts.
Figure 11:
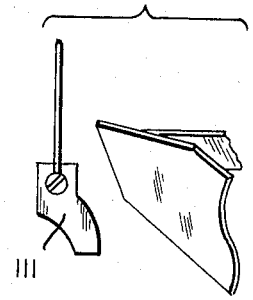
FIG. 11 is a detail of a grounding contact.

When the control lever extension 2 is in the zero position, the front extension of the control lever is at its highest position and the electrical contacts 6, 7, 8, are not touching the contacts 61, 71, 81, shown in FIG. 10 causing the electrical circuits to remain open. In this upper position of the control lever, the rear cross member 11 makes contact with the electrical wires that serve as grounds, one of which is 111 of FIG. 11. Also, in the zero position, the hood latch control stud 3 is positioned in the stud hole 311 of the hood latch release 31, FIG. 12, causing the hood latch to be inoperative.

Figure 4:
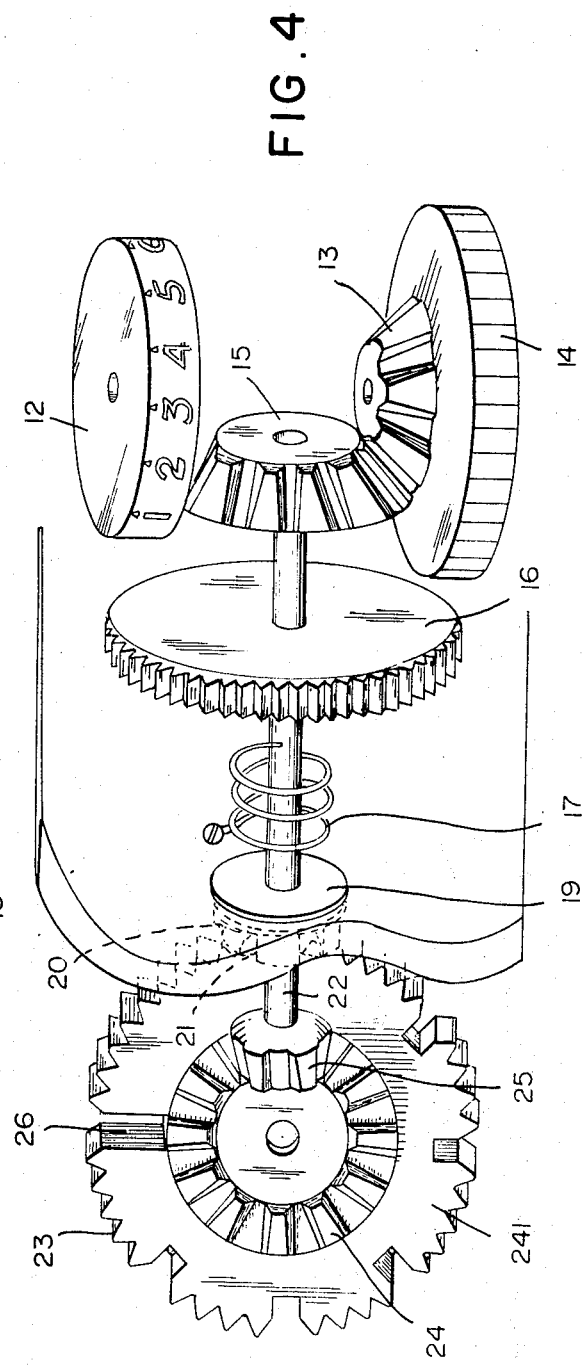
FIG. 4 is a perspective of the internal mechanism of the dial system.

In either the set or hold position the front extension 56 of the control lever is in its down most position and the locking teeth 51-55 of the control lever are within the five lock wheel slots of the dial mechanisms one of which is shown as 26 in FIG. 4. Also, the electrical contacts 6, 7, 8, are forced into the contacts 61, 71, 81, of FIG. 10 closing the electrical circuits and the hood latch control stud is out of the stud hole of the hood latch release making the hood latch release operative when in either the set or hold position. All grounds are also open in these two positions.

In the hold position, the control lever extension 2, FIG. 3, depresses the control lever extension spring 4 which provides a means of going from the set to the hold position without causing further motion of the control lever 1. The control lever extension 2 is made of spring steel and its inherent tension causes it to remain in the grooves of either the set or hold positions on the face of the device.

Figure 12:
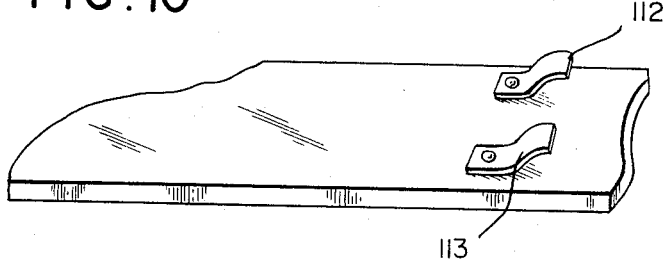
FIG. 12 is a perspective of the control lever restoring springs.

Springs 112 and 113 of FIG. 12 rest against the lower postion of the control lever when it is in either the set or the hold position and force the control lever upward when the control lever extension is removed from either the set or the hold grooves on the face of the device. These springs possess less tension than the control lever extension spring 4 permitting stable downward motion of the control lever extension 2 until the set position is reached and the control lever 1 ceases motion.

FIG. 4 is a diagram of the internal mechanism of the dial system. The selection dial 14 contains a bevel gear 13 that turns a bevel gear 15. This bevel gear 15 in turn is connected with a bevel gear (not visible) attached to the underside of the numbered wheel 12. Connected to and extending from the bevel gear 15 is a shaft 22 to which is attached a retaining rachet 16, a restoring spring 17, shaft guides 19 and 20, and a bevel gear 25 which turns the bevel gear 24 of the lock wheel 241.

When the control lever extension 2, FIG. 3, is in the zero position, by turning the selection dial 14 to the right as seen by the operator of this device, the numbered wheel 12 is made to rotate to the left by the bevel gear mechanism 15 and 13. The retaining rachet 16 rotates clockwise and is engaged by a retaining rachet catch, one of catches 31 to 35 of FIG. 5, which holds the rachet 16 in place against the tension of the restoring spring 17 which was winding more tightly as a result of the clockwise rotation of the shaft 22. Rotation of the shaft 22 results in the motion of the bevel gears 25 and 24 causing the lock wheel 241 to rotate.

When the proper number is selected on the numbered wheel 12 as seen in the window on the face of the device, the lock wheel slot 26 is in perfect alignment with one of the locking teeth, 51 to 55, FIG. 3, permitting the control lever 1 to be placed in the position it occupies when the control lever extension 2 is in either the set or hold position. The lock wheel slots of all 5 dial mechanisms must be in perfect alignment simultaneously for the control lever teeth to occupy the lock wheel slots. Lock wheel teeth 23 prevent the lock wheel 241 from being rotated while the control lever is being forced against the lock wheel without proper alignment of the lock wheel slot 26. A metal shield 18 through which the shaft 22 extends protects the lock wheel 241 from being forced out of place with any sharp instrument which might be forced through the windows on the face of this device.

Figure 5:
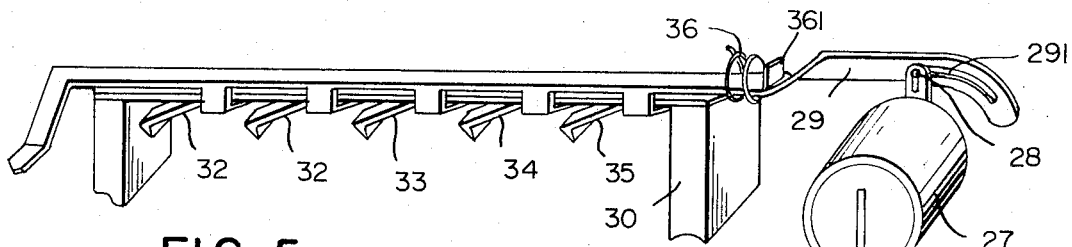
FIG. 5 is a perspective of the retaining rachet catches, set position release, and ignition switch mechanism.

FIG. 5 shows the retaining rachet, catches, set position release, and ignition switch mechanism. The ignition switch 27 contains an ignition switch lever 28 which is in an upright position when the ignition key is off or is in an upright position. An extension, partly visible, of the ignition switch lever 28 rides in the ignition switch lever slot 291 in such a manner that turning the ignition key to the right as seen by this diagram permits the ignition switch 27 and lever 28 to move freely.

This free movement permits ignition and normal operation of the automobile providing that the control lever 1, FIG. 3, is in either the set or the hold position, otherwise ignition is impossible. Turning the ignition key to the left or to what is now the accessory position moves the rachet catch and set position release rod 29 to the left causing the rachet catch depressors 292 to 297 to move to the left forcing the spring steel retaining ratchet catches 31 to 35 upward freeing the retaining ratchets, one of which is shown as 16 in FIG. 6. Motion of the ratchet catch and set position release rod 29 also causes the leftmost portion of this rod to force the control lever extension 2 out of the set position if it is in this setting which results in the control lever extension moving to the zero position.

The release rod restoring restoring spring 36 moves the ratchet catch and set position release rod 29 to its original position as the key is moved to the off position. This spring works between the spring support 361 and a portion of the ratchet catch base 30. The ratchet catch base 30 contains the retaining ratchet catches 31 to 35 and provides a base for the ratchet catch and set position release rod 29. The right most ratchet catch depressor 297 comes to rest on the ratchet catch base 30 inhibiting motion to the right of the ratchet catch and set position release rod 29 beyond the position required for proper operation limiting the action of the restoring spring 36.

Figure 6:
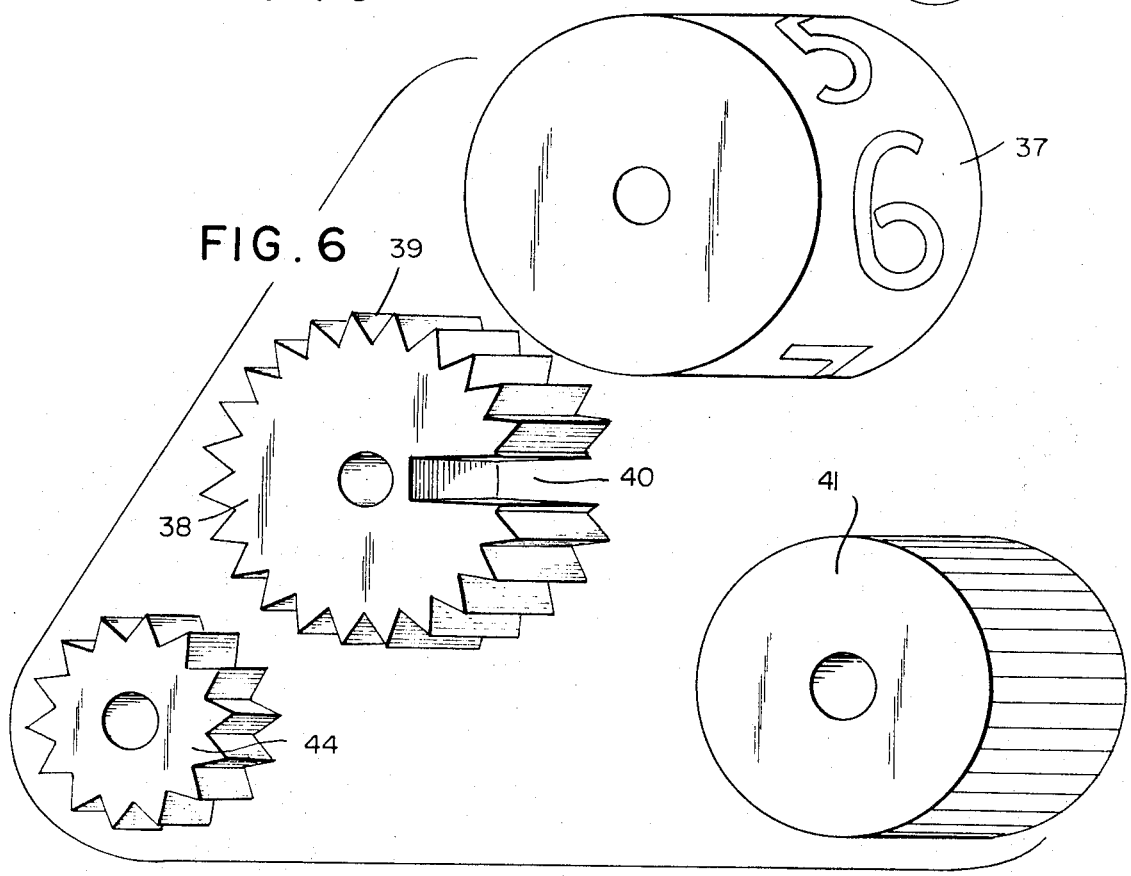
FIGS. 6 and 7 are perspectives of internal mechanisms of a modification of my invention.
Figure 7:
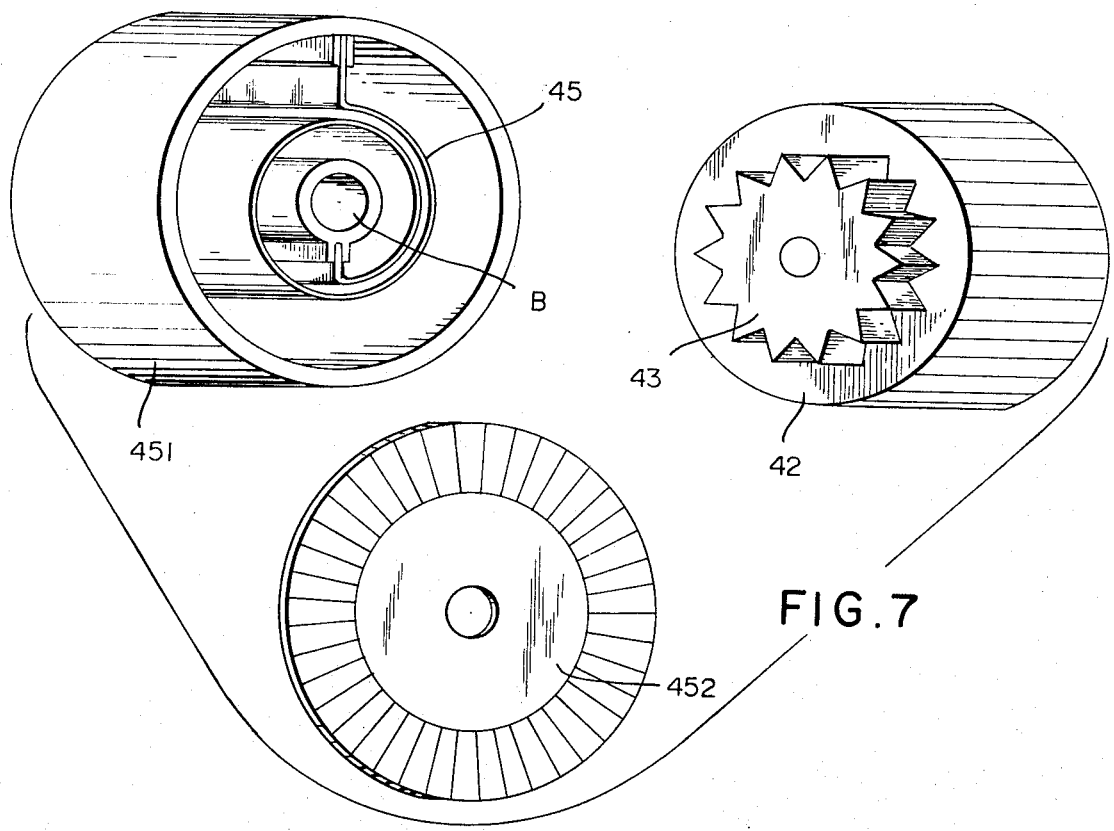
Figure 9:
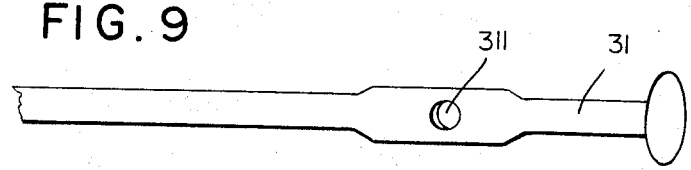
FIG. 9 is a detail of the hood latch release mechanism.

A second design of the device can have horizontal selection dials and horizontal numbered wheels. In this design the internal mechanism of the dial system shown in FIG. 4 can be replaced by the mechanism as seen in FIGS. 6 and 7. The selection dial gear II, 44, is affixed to the lock wheel 38 which in turn is affixed to the numbered wheel 37. Within the numbered wheel 37 there is a restoring spring 45, FIG. 9, which is attached to the numbered wheel 37 and to a stationary shaft at B. Attached to the right side of the numbered wheel 451 of FIG. 9 is a retaining rachet 452, FIG. 6.

Referring to FIGS. 6 and 7, the selection dial 41 contains on its right side a selection dial gear I, 43, which engages a selection dial gear II, 44. Downward motion of the selection dial 41 causes upward motion of the lock wheel 38 and numbered wheel 37 which in turn creates tension on on the restoring spring 45 (incorrectly wound in this diagram). The retaining ratchet 452 is engaged by a retaining ratchet catch, one of 49 to 53 of FIG. 8 which holds the numbered wheel in place against the tension of the restoring spring 45. There are 5 such dial mechanisms. The shaft on which the dial mechanism of FIG. 6 and 7 revolves is not shown. The lock wheel teeth 39 serve the same purpose as the lock wheel teeth 23 of FIG. 4 of the first design.

Figure 8:
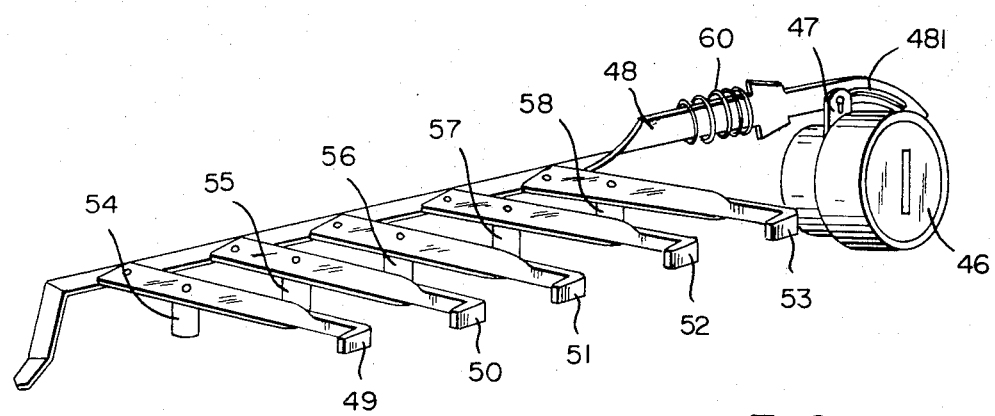
FIG. 8 is similar to FIG. 5 but showing elements used in the modification.

FIG. 8 illustrates the retaining ratchet catch, set position release, and ignition switch mechanism for the second design. The ignition switch 46, the ignition switch lever 47, the rachet catch and set position release rod 48, and the ratchet catch and set position release rod restoring spring 60 serve the same function as parts 27, 28, 29, and 36 respectively of FIG. 7. However, the spring steel retaining ratchet catches 49 to 53 now work by lever action pivoting about retaining ratchet catch bases 54 to 58. Motion of the ratchet catch and set position release rod 48 to the left causes disengagement of the retaining ratchet catches 49 to 53 from the retaining ratchets, one of which is shown as 452.

None of the figures showing the two designs of the device are drawn to proper proportions nor have the positions of the mountings of the various mechanisms within the device been shown. These positions should be easily determined from what has been said previously. The device need not have the outward appearance as shown in the figures. The shape may be modified to reduce material costs provided that the electrical wires and hood latch release cable are protected in some way.

SUMMARY OF OPERATION OF THE DEVICE

The Control Lever Extension
1. In the zero position: Desired electrical circuits are either open or grounded; the hood latch release is locked; the ignition switch is inoperable and the key may be left in the ignition switch.
2. In the set position: Electrical circuits are closed and grounds broken; the hood latch release operates; the ignition switch is operable; turning the ignition switch to the left or what is now the accessory position returns the control lever extension to the zero position and the register to a zero reading.
3. In the hold position: The car is operated normally as though the device were not present.

Total Possible Combinations of the Register: 99,999 (may be altered by adding or deleting dials as desired).

Accidental Removal of the Control Lever Extension to the Zero Position: The register maintains the proper combination until the ignition key is used to return the register to a zero reading.

OPTIONAL FEATURES

Eliminating the Ignition Key
1. The ignition switch may be removed from the device and the ignition switch lever 28 of FIG. 7 may be replaced by a hand operated lever extending outside of the device to provide the same function as the ignition switch lever 28. A starter button may then be added to the dashboard of the car to operate the starter of the car and with the control lever extension 2, FIG. 5, in either the set or the hold position (the hold position may be eliminated) the ignition circuit would operate the engine. Thus the key could be replaced by this device if it were so desired; all other previously described features being maintained.

Dialing against Time
2. A timing mechanism may easily be added to the device in the position now occupied by the ignition switch. Such a device would be used with the system described in part 1 above and its operation would involve initiation of the timing device by a push button or otherwise; dialing in the correct number on the register; setting the device in either the set or hold positions and pushing the starter button. Any misalignment of the numbers displayed on the register or failure to dial the numbers in the proper time would prevent the control lever from being placed in the proper position for operation of the auto due to the misalignment of the lock wheels or due to a metal stud or other mechanism which would be operated by a solenoid working with the timing device and which would be driven into the path of the control lever and remain for a preselected length of time. Push buttons might also be added to work along with the dials requiring alternate dialing and push button selection. This type of operation may be used to counteract drunken driving, but in cases of emergency requiring quick starts the excitement of the operator may render this use dangerous.

3. The device may be modified for installation on automobiles now in use. This modification may require using the unit solely as a hood locking mechanism and coil to points wire or starter wire ground.

OTHER APPLICATIONS

This device may be used to provide a means for "locking" any electronic system, device, or installation and restricting its use to those knowing the combination of the register. The dial mechanism and control lever may be applied to use on industrial machinery, farm equipment, or other antitheft or alarm systems in which the mechanism of the device would be protected by a heavy or impenatrable material. Since it is operated manually it could be used in any of its applications without fear of electrical malfunction.

While I have described my invention with particular reference to the drawings such is not to be considered as limiting its actual scope.

Having thus described this invention, what is asserted as new is:

1. Apparatus for enabling or disabling electric circuits comprising:
    a circuit breaker having three different manually operative positions: hold, set and zero;
    a register having positions for a plurality of digits and a like plurality of manually operable means, each means being adapted to enter any digit from zero through nine into the register in the corresponding digit position, said register being adapted to function with a pre-assigned number containing said plurality of digits; and
    means to automatically set said register to zero when the breaker is in zero position, said circuits being disabled when the register and/or breaker is at zero;
    wherein after the breaker is set to zero by said automatic means, the correct number is entered into the register by said entering means, and the breaker is then placed in set or hold by said automatic means and said circuits are enabled;
    wherein said circuits are disabled by said automatic means whenever an incorrect number is entered into the register;
    wherein a key operated ignition switch is employed, said switch being operative in conventional manner when the breaker is in hold;
    in combination with means whereby rotation of the key to accessory position when the breaker is in set causes said circuits to be disabled.

* * * * *